(12) United States Patent
Chi (10) Patent No.: US 12,174,289 B2
(45) Date of Patent: Dec. 24, 2024

(54) DOPPLER SIGNAL PROCESSING DEVICE AND METHOD THEREOF FOR INTERFERENCE SUPPRESSION

(71) Applicant: RichWave Technology Corp., Taipei (TW)

(72) Inventor: Hsiang-Feng Chi, Taipei (TW)

(73) Assignee: RichWave Technology Corp., Taipei (TW)

( * ) Notice: Subject to any disclaimer, the term of this patent is extended or adjusted under 35 U.S.C. 154(b) by 859 days.

(21) Appl. No.: 17/228,722

(22) Filed: Apr. 13, 2021

(65) Prior Publication Data
US 2021/0231789 A1    Jul. 29, 2021

Related U.S. Application Data

(63) Continuation-in-part of application No. 16/418,967, filed on May 21, 2019, now Pat. No. 11,520,031.

(30) Foreign Application Priority Data

Jun. 28, 2018    (TW) .................................. 107122253

(51) Int. Cl.
*G01S 13/52*    (2006.01)
*G01S 7/02*    (2006.01)
(Continued)

(52) U.S. Cl.
CPC .......... *G01S 13/5244* (2013.01); *G01S 7/023* (2013.01); *G01S 13/52* (2013.01); *G01S 13/53* (2013.01)

(58) Field of Classification Search
CPC ...... G01S 13/5244; G01S 13/52; G01S 7/023; G01S 13/53
(Continued)

(56) References Cited

U.S. PATENT DOCUMENTS 5,309,161 A    5/1994 Urkowitz
6,091,361 A    7/2000 Davis
(Continued)

FOREIGN PATENT DOCUMENTS

CN    104586434 B    1/2017
CN    107144825 A    9/2017
(Continued)

OTHER PUBLICATIONS

Madisetti et al, "Digital Signal Processing Handbook" CRCnetBASE, CRC Press LLC, 1999 (Year: 1999).*
(Continued)

*Primary Examiner* — Bernarr E Gregory
*Assistant Examiner* — Samarina Makhdoom
(74) *Attorney, Agent, or Firm* — Winston Hsu (57) ABSTRACT

The Doppler signal processing device includes a frequency analyzer, an interference suppressor, an interference baseline estimator and a synthesizer. The frequency analyzer can generate a frequency domain signal according to a digital signal. The interference suppressor can perform a suppression operation to generate an interference suppressed frequency domain signal. The interference baseline estimator can generate or update the frequency domain interference estimation signal according to the frequency domain signal. The synthesizer can generate an interference suppressed digital signal according to the interference suppressed frequency domain signal, where the interference suppressed digital signal is related to the digital signal with the interference energy suppressed.

20 Claims, 8 Drawing Sheets

(51) Int. Cl.
*G01S 13/524* (2006.01)
*G01S 13/53* (2006.01)

(58) Field of Classification Search
USPC .......................................................... 342/159
See application file for complete search history.

(56) References Cited

U.S. PATENT DOCUMENTS

| | | | |
|---|---|---|---|
| 7,375,676 B1* | 5/2008 | Loberger | G01S 7/2928 |
| | | | 342/99 |
| 8,947,672 B2 | 2/2015 | Schmoll | |
| 9,229,102 B1* | 1/2016 | Wright | G01S 13/885 |
| 9,857,454 B1* | 1/2018 | Liu | G01S 7/292 |
| 2009/0309785 A1* | 12/2009 | Nalezinski | G01S 7/0235 |
| | | | 342/200 |
| 2010/0124266 A1* | 5/2010 | Cho | H04L 25/03159 |
| | | | 375/232 |
| 2010/0152600 A1* | 6/2010 | Droitcour | A61B 5/7221 |
| | | | 600/534 |
| 2016/0195606 A1* | 7/2016 | Sugino | G01S 7/023 |
| | | | 342/195 |
| 2017/0010344 A1* | 1/2017 | Corbett | G01S 7/023 |
| 2017/0269193 A1* | 9/2017 | Yamaoka | G01S 13/53 |
| 2018/0106897 A1 | 4/2018 | Shouldice | |
| 2018/0263502 A1 | 9/2018 | Lin | |
| 2019/0015277 A1 | 1/2019 | Sauser | |
| 2020/0003864 A1 | 1/2020 | Chi | |

FOREIGN PATENT DOCUMENTS

| | | |
|---|---|---|
| CN | 111077514 A | 4/2020 |
| EP | 2 857 860 A1 | 4/2015 |
| EP | 2 940 486 A1 | 11/2015 |
| EP | 3 588 126 A1 | 1/2020 |
| TW | 569008 | 1/2004 |
| TW | I315617 | 10/2009 |
| TW | I669522 B | 8/2019 |
| TW | 202028776 A | 8/2020 |

OTHER PUBLICATIONS

Madisetti et al. "Digital Signal Processing, Handbook" Chapman & Hall CRCnetBASE (Year: 1999).*
Office action mailed on Aug. 5, 2022 for the Taiwan application No. 110133880, filing date Sep. 11, 2021, pp. 1-6, Aug. 5, 2022.
Notice Of Allowance mailed on Aug. 25, 2022 for the U.S. Appl. No. 16/418,967, filed May 21, 2019, pp. 1-16.
Office action mailed on Feb. 25, 2022 for the U.S. Appl. No. 16/418,967, filed May 21, 2019, p. 1-38 , Feb. 25, 2022.

* cited by examiner

DOPPLER SIGNAL PROCESSING DEVICE AND METHOD THEREOF FOR INTERFERENCE SUPPRESSION

CROSS REFERENCE TO RELATED APPLICATION

This is a continuation-in-part (CIP) application of U.S. application Ser. No. 16/418,967 filed on 2019 May 21, which is included and incorporated herein by reference in its entirety.

TECHNICAL FIELD

The present invention is related to a Doppler signal processing device, in particular, a Doppler signal processing device for suppressing interference in a background.

BACKGROUND

When using radar devices to detect objects, there is often the problem of background interference. For example, if a radar device is used to detect vital signs or human body, the background interference is often large, resulting in incorrect detection. In order to reduce the impact of background interference, signal energy threshold device or frequency energy detection method can be used to determine the detection results. However, these methods do not provide high accuracy detection results.

SUMMARY

An embodiment provides a Doppler signal processing device for suppressing interference in a background according to a received wireless signal. The Doppler signal processing device comprises a frequency analyzer, an interference suppressor, an interference baseline estimator and a synthesizer. The frequency analyzer is configured to generate a frequency domain signal according to a digital signal, where the digital signal corresponds to the received wireless signal and comprises interference energy generated by the interference in the background. The interference suppressor is configured to perform a suppression operation according to the frequency domain signal and a frequency domain interference estimation signal to generate an interference suppressed frequency domain signal, where the interference energy in frequency domain is suppressed by the frequency domain interference estimation signal in the interference suppressed frequency domain signal. The interference baseline estimator is configured to generate or update the frequency domain interference estimation signal according to the frequency domain signal, where the frequency domain interference estimation signal corresponds to an energy distribution of the interference in the frequency domain. The synthesizer is configured to generate an interference suppressed digital signal according to the interference suppressed frequency domain signal, where the interference suppressed digital signal is related to the digital signal with the interference energy suppressed.

Another embodiment provides a Doppler signal processing method for suppressing interference in a background according to a received wireless signal. The Doppler signal processing method comprises generating a frequency domain signal according to a digital signal, where the digital signal corresponds to the received wireless signal and comprises interference energy generated by the interference in the background; performing a suppression operation according to the frequency domain signal and a frequency domain interference estimation signal to generate an interference suppressed frequency domain signal, where the interference energy in frequency domain is suppressed in the interference suppressed frequency domain signal; generating or updating the frequency domain interference estimation signal according to the frequency domain signal, where the frequency domain interference estimation signal corresponds to an energy distribution of the interference in the frequency domain; and generating an interference suppressed digital signal according to the interference suppressed frequency domain signal, where the interference suppressed digital signal is related to the digital signal with the interference energy suppressed.

DETAILED DESCRIPTION

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

Figure 1:
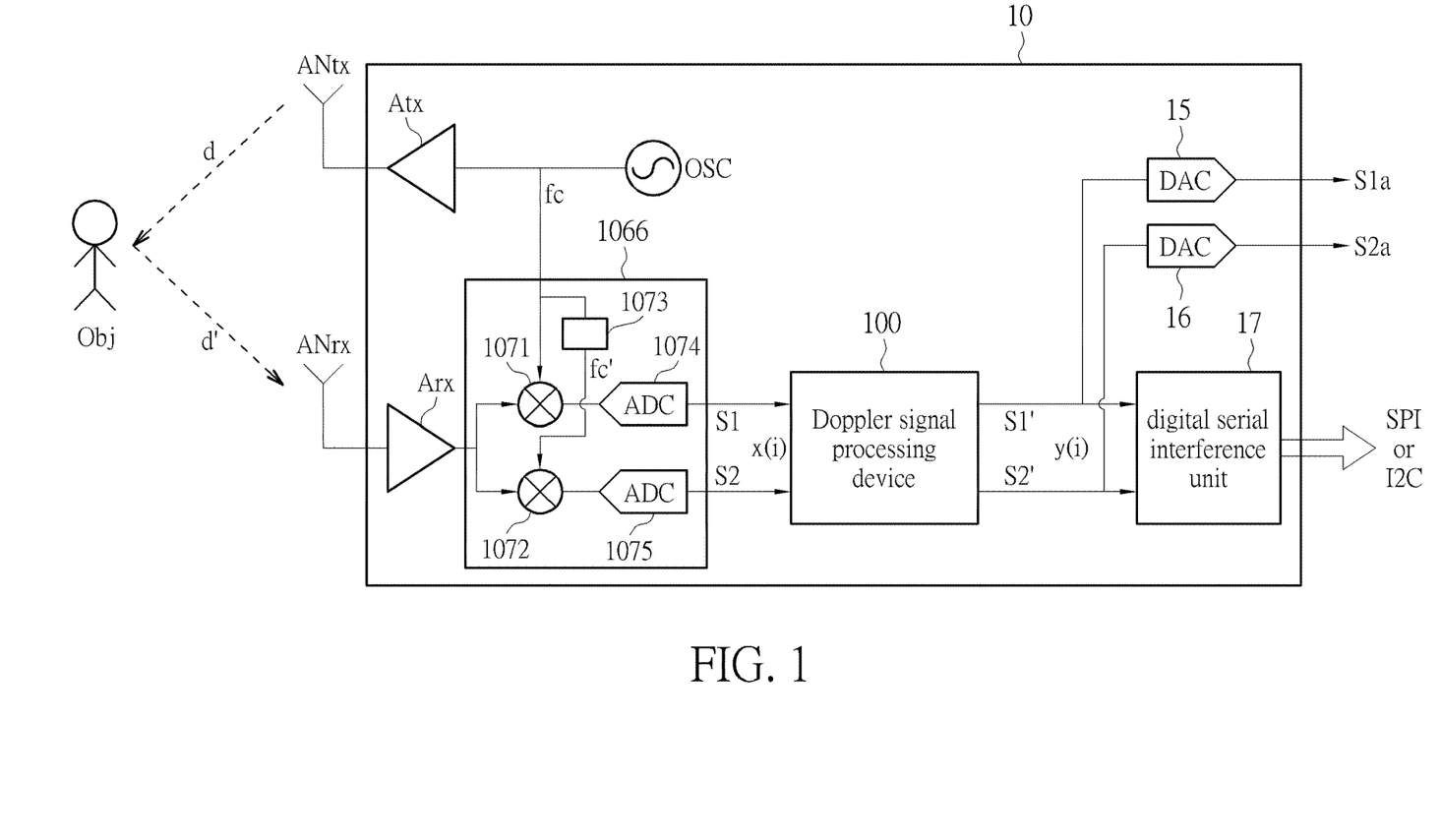
FIG. 1 illustrates a signal detection device used to detect an object according to an embodiment.

FIG. 1 illustrates that a signal detection device 10 is used to detect an object Obj according to an embodiment. The signal detection device 10 can be a radar. The signal detection device 10 can include antennas ANtx and ANrx, amplifying devices Atx and Arx, an oscillator OSC, a receiving unit 1066 and a Doppler signal processing device 100. The Doppler signal processing device 100 can suppress interference as describe below. The signal detection device 10 can further include digital-to-analog converters 15 and 16, and a digital serial interference unit 17. The couplings among the components can be shown as FIG. 1.

The oscillator OSC can provide a carrier signal fc, and the carrier signal fc can have a fixed frequency. The amplifying device Atx, such as a power amplifier, can output a wireless signal d, such as an RF (radio frequency) transmission signal, which is transmitted by the antenna ANtx. The wireless signal d can be generated according to the carrier signal fc. A generator for the signal d can be disposed optionally between the oscillator OSC and the amplifying device Atx according to the carrier signal fc. If an object Obj (for example, a human body) is present in the aperture of antenna ANtx, the object Obj can reflect the wireless signal d, thereby scattering a received wireless signal d', such as an RF receiving signal. The antenna ANrx can receive the reflected signal d', which can be amplified by the amplifying device Arx, such as a low-noise amplifier, and inputted to the receiving unit 1066.

The receiving unit 1066 can generate at least one digital signal according to the carrier signal fc and the received signal d'. For example, the receiving unit 1066 can include mixers 1071 and 1072, phase shift unit 1073, and analog-to-digital converters (ADC) 1074 and 1075. The mixer 1071 can mix the carrier signal fc and the received signal d', and the result can be converted into a digital signal S1 by the analog-to-digital converter 1074. The phase shift unit 1073 can shift the phase of the carrier signal fc by a specific angle (e.g., 90 degrees) to generate an adjusted carrier signal fc'. The mixer 1072 can mix the adjusted carrier signal fc' and the received signal d', and the result can be converted into a digital signal S2 by the analog-to-digital converter 1075. The at least one digital signal outputted by the receiving unit 1066 may include the digital signals S1 and S2 outputted by the analog-to-digital converters 1074 and 1075.

For example, the digital signals S1 and S2 can be respectively related to an in-phase channel and a quadrature channel for In-phase/quadrature (I/Q) modulation. The digital signals S1 and S2 can be processed by the Doppler signal processing device 100 to generate the digital signals S1' and S2' by suppressing the interference portion of the digital signals S1 and S2.

The digital signals S1' and S2' can be respectively processed by the digital-to-analog converters 15 and 16 to generate analog signals S1a and S2a. For example, the signals S1a and S2a can be respectively related to an in-phase channel and a quadrature channel for I/Q modulation. The digital signals S1' and S2' can be processed by the digital serial interference unit 17 to generate data used for object detection. The data generated by the digital serial interference unit 17 can be transmitted through an SPI (serial peripheral interface) or an I²C (inter-integrated circuit) interface to be analyzed by a device selected by the user. For example, an MCU (microcontroller unit) can be used to analyze the data generated by the digital serial interference unit 17 for detecting the object Obj. Since the interference portion has been suppressed, the signals S1' and S2' can be more "clean", and the user is allowed to use relatively simpler hardware/software to process the data about detecting the object Obj. The architecture of the receiving unit 1066 of FIG. 1 is merely an example, and not to limit the circuit structure.

Figure 2:
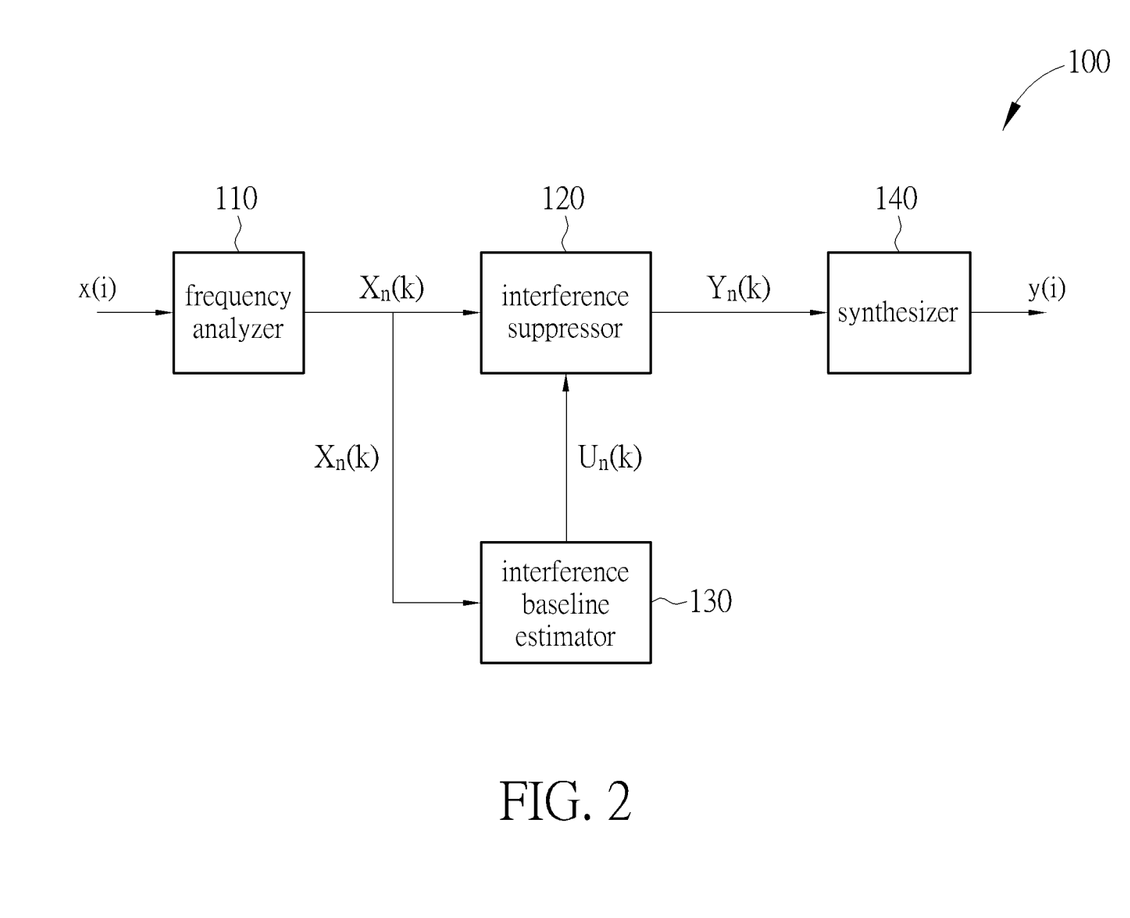
FIG. 2 illustrates the Doppler signal processing device of FIG. 1.

FIG. 2 illustrates the Doppler signal processing device 100 of FIG. 1. The Doppler signal processing device 100 can suppress interference in a background according to the received wireless signal d'. The interference being suppressed can be stationary interference, for example, a quasi-stationary interference. The Doppler signal processing device 100 can include a frequency analyzer 110, an interference suppressor 120, an interference baseline estimator 130 and a synthesizer 140. In FIG. 2, i can be an index of time, n can be an index of time domain block, and k can be an index of frequency, namely frequency bin.

The frequency analyzer 110 can generate a frequency domain signal $X_n(k)$ according to a digital signal x(i). The digital signal x(i) of FIG. 2 can be corresponding to the signals S1 and/or S2 of FIG. 1 and be raw data of the in-phase channel and the quadrature channel related to I/Q modulation. The digital signal x(i) can correspond to the received wireless signal d' and include interference energy (to be suppressed) generated by the interference in the background.

The interference suppressor 120 can perform a suppression operation according to the frequency domain signal $X_n(k)$ and a frequency domain interference estimation signal $U_n(k)$ to generate an interference suppressed frequency domain signal $Y_n(k)$. The interference energy in frequency domain can be suppressed by the frequency domain interference estimation signal $U_n(k)$ in the interference suppressed frequency domain signal $Y_n(k)$.

The interference baseline estimator 130 can generate or update the frequency domain interference estimation signal $U_n(k)$ according to the frequency domain signal $X_n(k)$. The frequency domain interference estimation signal $U_n(k)$ can correspond to an energy distribution of the interference (e.g., the quasi-stationary interference energy) in the frequency domain.

The synthesizer 140 can generate an interference suppressed time domain digital signal y(i) according to the interference suppressed frequency domain signal $Y_n(k)$. The interference suppressed digital signal y(i) can be related to the digital signal x(i) with the interference energy suppressed. Regarding FIG. 1 and FIG. 2, the signal y(i) shown in FIG. 2 can be corresponding to the signals S1' and S2' shown in FIG. 1.

In FIGS. 2-6, the frequency domain signal $X_n(k)$ can include a frequency domain signal vector; and the frequency domain interference estimation signal $U_n(k)$ can include a frequency domain interference estimation signal vector.

Figure 3:
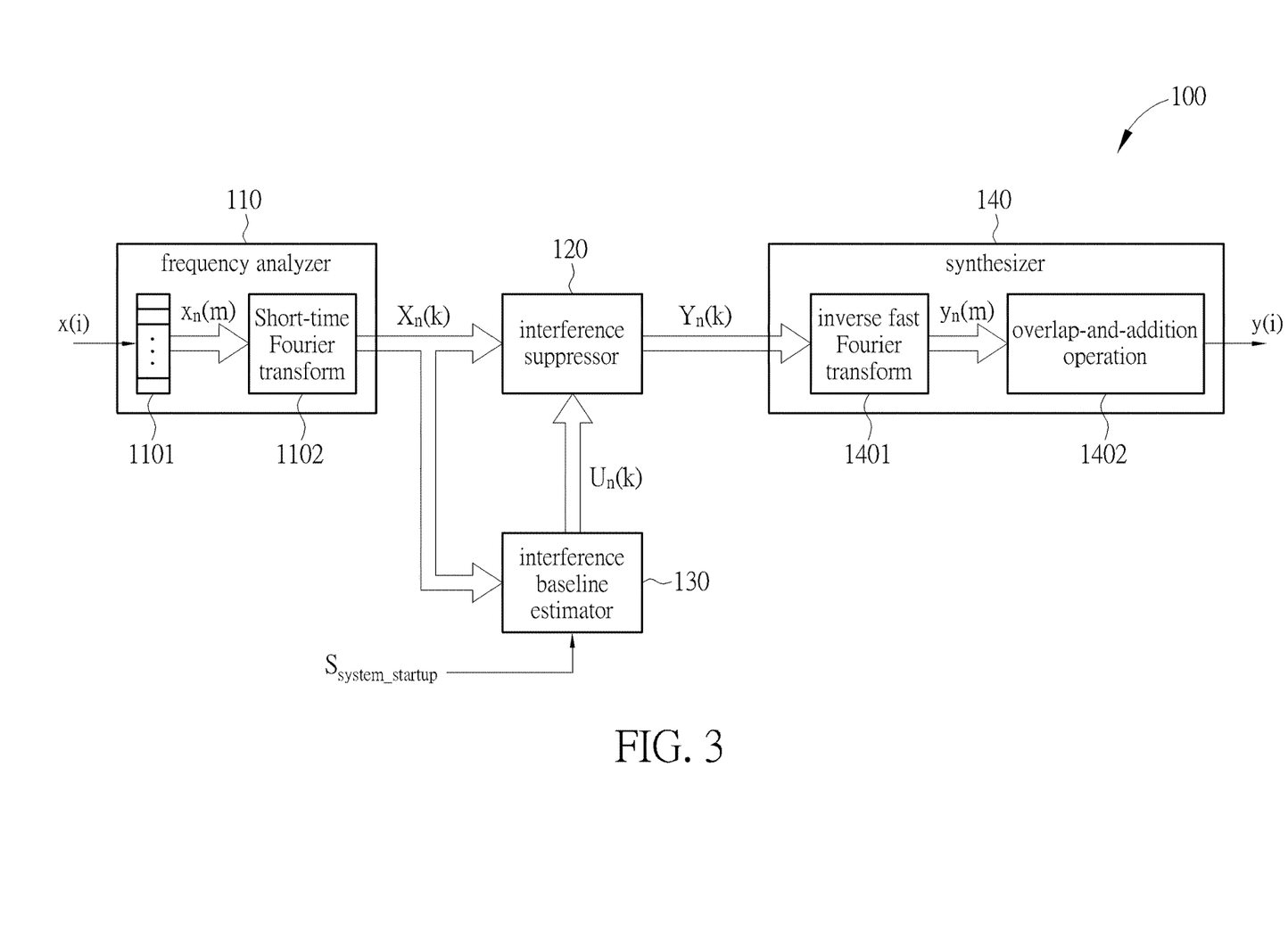
FIG. 3 illustrates the Doppler signal processing device of FIG. 1 and FIG. 2 according to an embodiment.

FIG. 3 illustrates the Doppler signal processing device 100 of FIG. 1 and FIG. 2 according to an embodiment. As shown in FIG. 3, the frequency analyzer 110 can perform a short-time Fourier transform 1102 to generate the frequency domain signal $X_n(k)$ by using the digital signal x(i). The frequency analyzer 110 can further perform a buffer operation 1101 to collect the digital signal x(i) of different time points as an input of the short-time Fourier transform 1102.

As shown in FIG. 3, the synthesizer 140 can perform an inverse fast Fourier transform (Inverse FFT) 1401 by using the interference suppressed frequency domain signal $Y_n(k)$ to generate a time-domain signal $y_n(m)$ related to the interference suppressed digital signal y(i). The synthesizer 140 can further perform an overlap-and-addition operation 1402 by using the time-domain signal $y_n(m)$ to generate the interference suppressed digital signal y(i).

Figure 4:
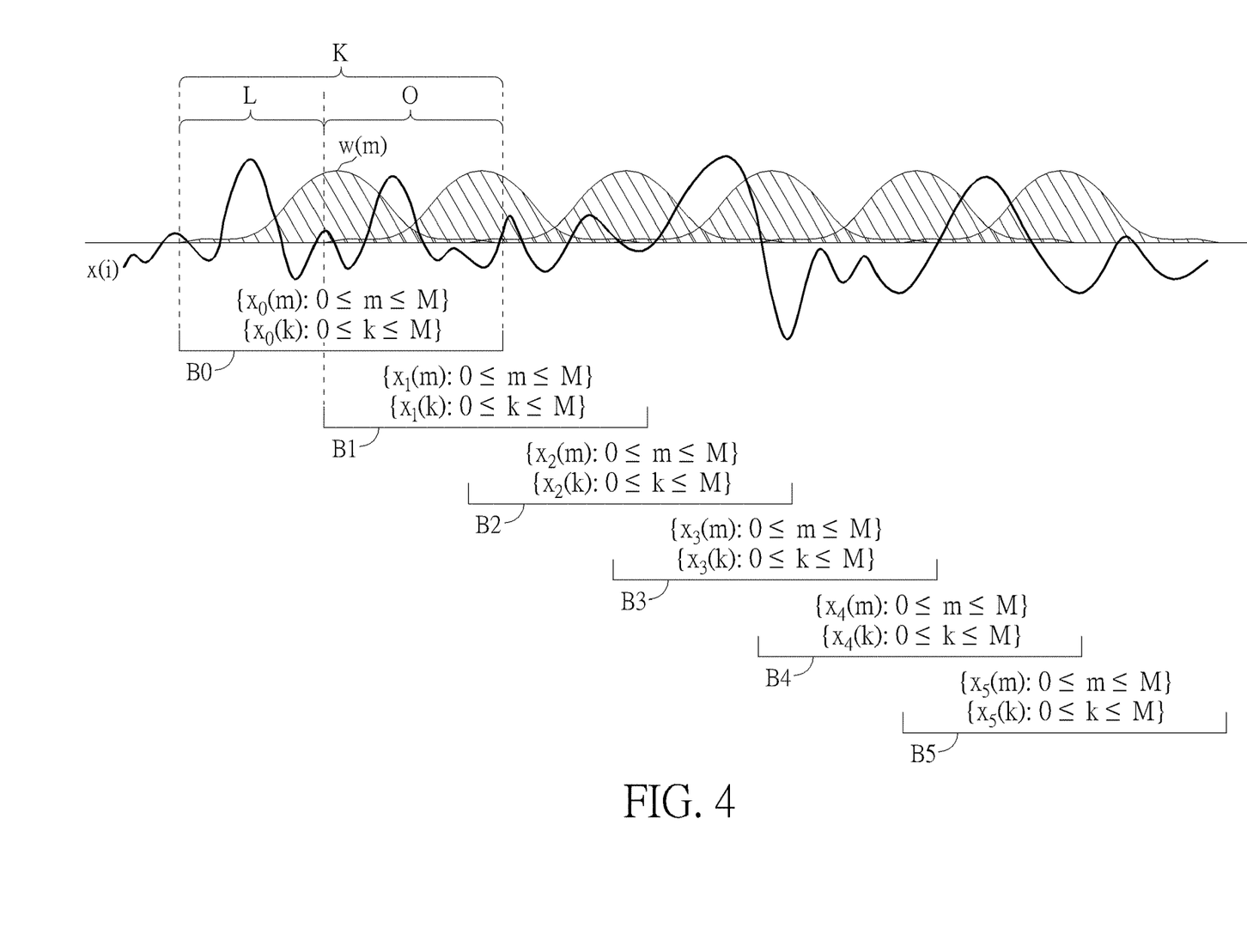
FIG. 4 illustrates the processing of signals of short-time Fourier transform related to FIG. 3.

FIG. 4 illustrates the processing of signals of short-time Fourier transform (STFT) related to FIG. 3. In FIG. 3 and FIG. 4, M, K, L and O can be indexes related to discrete time signal, signals denoted with X can be related to frequency domain, signals denoted with x can be related to time domain, and m and n can be indexes of time domain block.

Regarding FIG. 3 and FIG. 4, for example, the buffer operation 1101 can include collecting K samples of the digital signal x(i) so as to generate the signal $x_n(m)$. The frequency domain signal $X_n(k)$ can be expressed as: $\{X_n(k): k=0\sim(K-1)\}$. The interference suppressed frequency domain signal $Y_n(k)$ can be expressed as $\{Y_n(k): k=0\sim(K-1)\}$.

In FIG. 3, the interference suppressed frequency domain signal $Y_n(k)$ can be expressed as $Y_n(k)=A_n(k)\times e^{j\angle Xn(k)}$, or be expressed as $Y_n(k)=B_n(k)\times e^{j\angle Xn(k)}$ as below.

In some embodiments, the interference suppressed frequency domain signal $Y_n(k)$ can be expressed as $Y_n(k)=A_n(k)\times e^{j\angle Xn(k)}$ according to a spectral subtraction method, where $A_n(k)=\text{MAX}\{|X_n(k)|-\alpha\cdot U_n(k),\eta\}$. The parameter $\beta$ can be a minimum of $A_n(k)$, and the parameter $\alpha$ can be adjusted to control the signal-to-noise ratio (SNR) so as to achieve a target SNR.

In some other embodiments, the interference suppressed frequency domain signal $Y_n(k)$ can be expressed as $Y_n(k) = B_n(k) \times e^{j\angle Xn(k)}$ according to a spectral weighting method, where $B_n(k) = (|X(k)|/(1+\beta \cdot U_n(k)))$. The parameter $\beta$ can be adjusted to control the signal-to-noise ratio (SNR) so as to achieve a target SNR.

In FIG. 3, the short-time Fourier transform 1102 can analyze and transform the data of time domain (e.g., the signal $x_n(m)$) to generate the data of frequency domain (e.g., the signal $X_n(k)$). The interference baseline estimator 130 can estimate the interference baseline related to the interference of the stationery frequency ranges. For example, the interference can be (but not limited to) from the fan, the fluorescent lamps, the adapter or the air conditioners. The interference can be suppressed to improve the accuracy of detecting the object Obj. In the signal $Y_n(k)$ of FIG. 3, the portions of the interference have been reduced. The inverse fast Fourier transform 1401 can be performed for processing the signal $Y_n(k)$ of the frequency domain to the signal $y_n(m)$ of time domain.

The STFT 1102 of FIG. 3 can be as shown in FIG. 4. FIG. 4 merely provides an example instead of limiting the scope of the embodiments. In FIG. 4, the operation of six blocks B0 to B5 are illustrated. The horizontal axis in FIG. 4 can correspond to a sample index on time domain for analog signal processing (ASP). The block B0 can be related to n=1, the block B1 can be related to n=2, and so on. Regarding Block B0, there can be K samples, where L samples can be not overlapped, and O samples can be overlapped with a part of the samples of the block B1.

According to embodiments, the signals $x_n(m)$, $X_n(k)$, $y_n(m)$ and $y(i)$ mentioned above can be expressed and obtained according to the equations eq-1 to eq-4 below;

$$x_n(m) = \begin{cases} w(m) \bullet x(n \bullet L + m), & 0 \leq m < M \\ 0, & \text{otherwise} \end{cases} \quad \text{eq-1}$$

$$X_n(k) = FFT\{x_n(m)\} = \sum_{m=0}^{M-1} x_n(m) \bullet \exp\left(-j\frac{2\pi km}{M}\right); \quad \text{eq-2}$$

$$y_n(m) = IFFT\{Y_n(k)\} = \sum_{m=0}^{M-1} y_n(k) \bullet \exp\left(j\frac{2\pi km}{M}\right), 0 \leq m < M; \quad \text{eq-3}$$

and $$y_i = \sum_n y_n(i - n \bullet L); \quad \text{eq-4}$$

where M and K can be positive integers, M≤K, and M can be optionally equal to K. The equation eq-1 can be related to the buffer operation 1101 shown in FIG. 3, where w(m) can be a known window signal as shown in FIG. 4. The equation eq-2 can be related to the short-time Fourier transform 1102 shown in FIG. 3. The equation eq-3 can be related to the inverse fast Fourier transform 1401 shown in FIG. 3. The equation eq-4 can be related to the overlap-and-addition operation 1402 shown in FIG. 3. The equations eq-1 to eq-4 describe the operation principles of the Doppler signal processing device 100.

Figure 5:
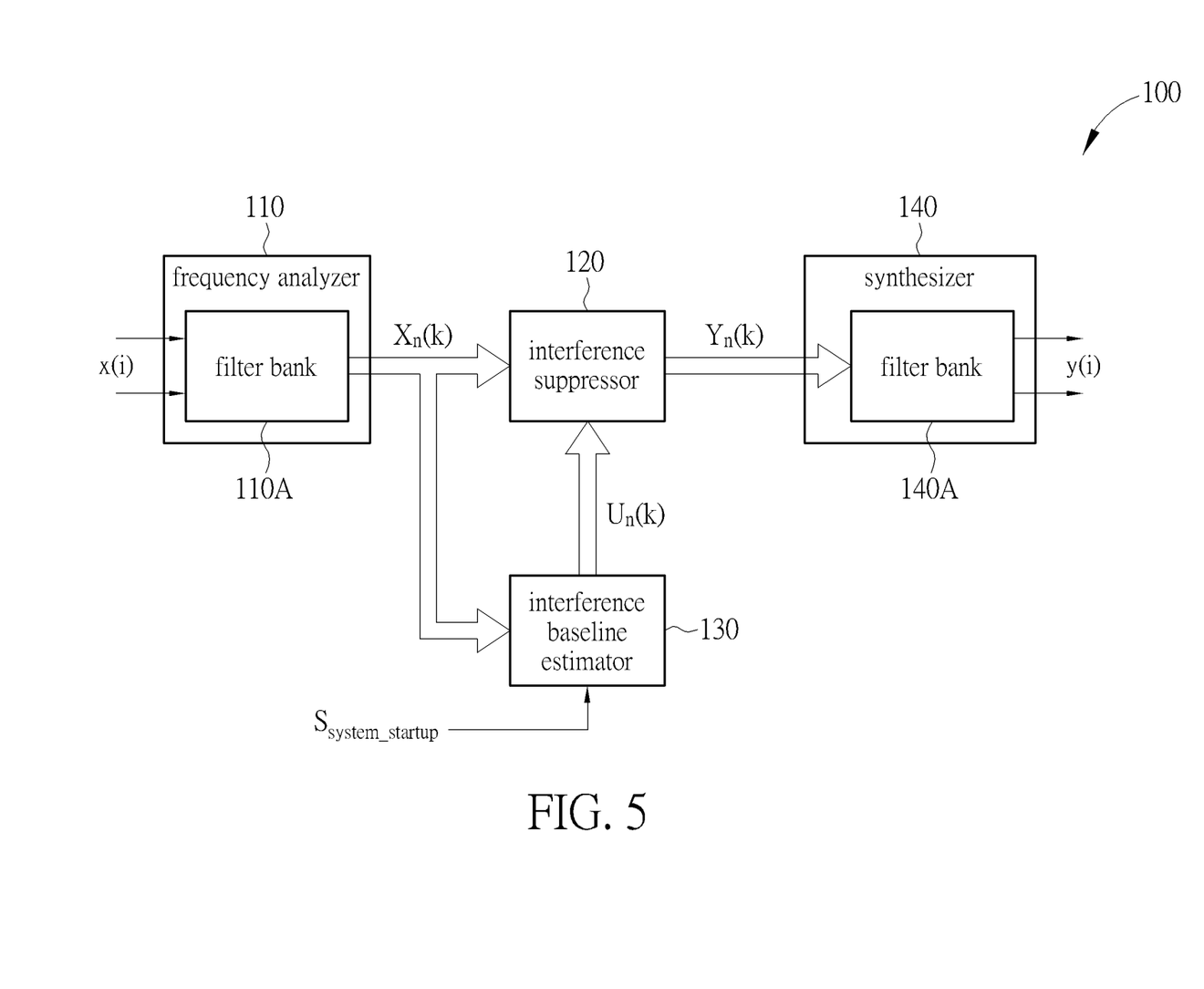
FIG. 5 illustrates the Doppler signal processing device of FIG. 1 and FIG. 2 according to another embodiment.

FIG. 5 illustrates the Doppler signal processing device 100 of FIG. 1 and FIG. 2 according to another embodiment. As shown in FIG. 5, the frequency analyzer 110 can include a first filter bank 110A used to filter the digital signal x(i) to generate the frequency domain signal $X_n(k)$. As shown in FIG. 5, the frequency synthesizer 140 can include a second filter bank 140A used to filter the interference suppressed frequency domain signal $Y_n(k)$ to generate the interference suppressed digital signal y(i). According to embodiments, the filter bank 110A can be an analysis filter bank, and the filter bank 140A can be a synthesis filter bank. For example, the filter bank 110A can be decimated and the filter bank 140A can be interpolated correspondingly, or the filter bank 110A can be non-decimated and the filter bank 140A can be non-interpolated correspondingly.

In FIG. 5, the interference suppressed frequency domain signal $Y_n(k)$ can be expressed as $Y_n(k) = A_n(k) \cdot e^{j\angle Xn(k)}$, or be expressed as $Y_n(k) = B_n(k) \cdot e^{j\angle Xn(k)}$ as below.

In some embodiments, the interference suppressed frequency domain signal $Y_n(k)$ can be expressed as $Y_n(k) = A_n(k) \cdot e^{j\angle Xn(k)}$ according to a spectral subtraction method, where $A_n(k) = MAX\{|X_n(k)| - \alpha \cdot U_n(k), \eta\}$. The parameter f can be a minimum of $A_n(k)$, and the parameter a can be adjusted to control the signal-to-noise ratio (SNR) so as to achieve a target SNR.

In some other embodiments, the interference suppressed frequency domain signal $Y_n(k)$ can be expressed as $Y_n(k) = B_n(k) \cdot e^{j\angle Xn(k)}$ according to a spectral weighting method, where $B_n(k) = (|X_n(k)|/(1+\beta \cdot U_n(k)))$. The parameter $\beta$ can be adjusted to control the signal-to-noise ratio (SNR) so as to achieve a target SNR. In this case, the zero-forcing method can be used. For example, this case can be related to the filer about Wiener solution. In this case, the intensity of the signal can be reduced while the phase can be kept.

Figure 6:
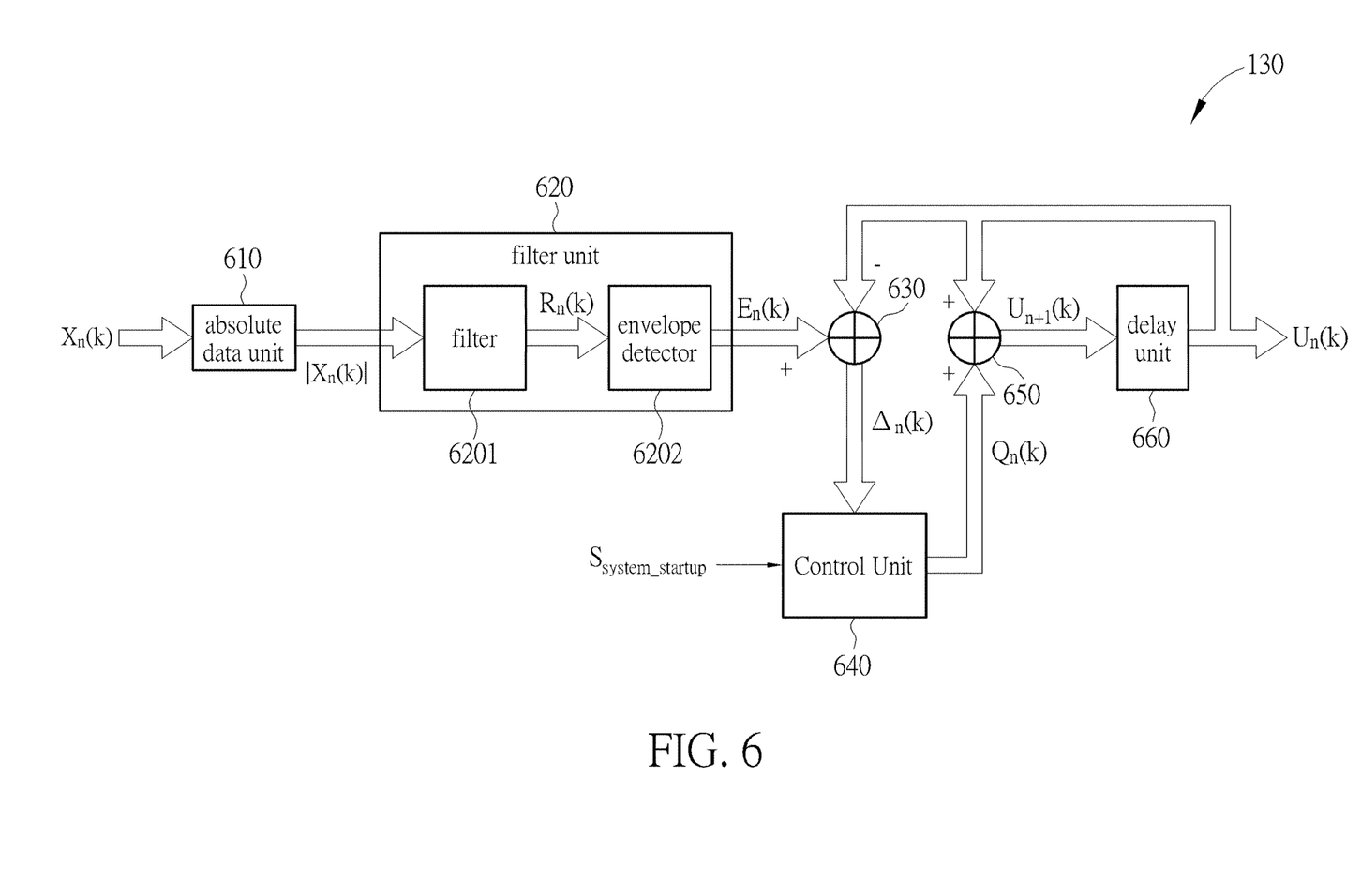
FIG. 6 illustrates the interference baseline estimator mentioned in FIG. 2, FIG. 3 and FIG. 5.

FIG. 6 illustrates the interference baseline estimator 130 mentioned in FIG. 2, FIG. 3 and FIG. 5. As shown in FIG. 6, the interference baseline estimator 130 can include an absolute data unit 610, a filter unit 620, a subtracter 630, a control unit 640, an adder 650 and a delay unit 660.

The absolute data unit 610 can generate absolute data $|X_a(k)|$ of the frequency domain signal $X_n(k)$. The filter unit 620 can generate a filtered signal ($R_n(k)$ or $E_n(k)$) according to the absolute data $X_n(k)$. The subtracter 630 can generate difference data $\Delta_n(k)$ of the filtered signal ($R_n(k)$ or $E_n(k)$) and the frequency domain interference estimation signal $U_n(k)$. The control unit 640 can process the difference data $\Delta_n(k)$ to generate adjustment data $Q_n(k)$. The adder 650 can add the adjustment data $Q_n(k)$ and the frequency domain interference estimation signal $U_n(k)$ to generate an updated frequency domain interference estimation signal $U_{n+1}(k)$. The delay unit 660 can use the updated frequency domain interference estimation signal $U_{n+1}(k)$ to replace the frequency domain interference estimation signal $U_n(k)$. In other words, the signals $U_n(k)$ and $U_{n+1}(k)$ can be respectively related to a frequency domain signal block index and a next block index on the timeline, where the difference between the two frequency domain signal block indices can be related by the delay unit 660.

According to embodiments, the absolute data $|X_n(k)|$ can include an absolute value, the difference data $\Delta_n(k)$ can include a difference value, the adjustment data $Q_n(k)$ can include an adjustment value, and the filtered signal $R_n(k)$ or $E_n(k)$ can include a filtered signal vector.

Regarding the filter unit 620, the filter unit 620 can at least include a filter 6201 and optionally further include an envelope detector 6202. The filter 6201 can be filtering operations conducted in block index n on the timeline and/or in frequency bin k.

If the filter unit 620 includes the filter 6201 and does not include the envelope detector 6202, the filter 6201 can filter the absolute data $|X_n(k)|$ to generate the filtered signal $R_n(k)$, and the signal filtered signal $R_n(k)$ can be inputted to the subtracter 630.

In another case, if the filter unit 620 include both the filter 6201 and the envelope detector 6202, the filter 6201 can filter the absolute data $|X_n(k)|$ to generate the filtered signal $R_n(k)$ as a preliminary filtered signal, where the preliminary filtered signal can include a preliminary filtered signal vector. The envelope detector 6202 can obtain the envelop information of the preliminary filtered signal $R_n(k)$ to generate the filtered signal $E_n(k)$. The envelope detector 6202 can be used to smoothen the result on the timeline and reduce the unwanted jitters caused by sudden noise since the system is mainly used to deal with stationary interference.

Figure 7:
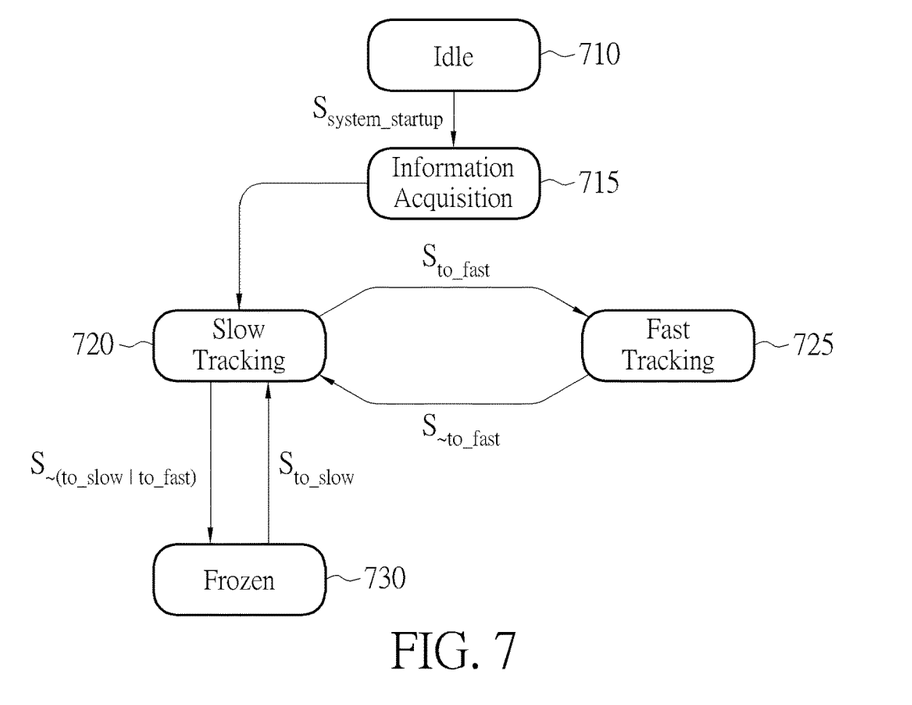
FIG. 7 illustrates a finite state machine (FSM) of the control unit of FIG. 6.

FIG. 7 illustrates a finite state machine (FSM) of the control unit 640 of FIG. 6. The control unit 640 can be used for tracking control, and the tracking control FSM of the $k_{th}$ frequency bin is shown in FIG. 7. As shown in FIG. 7, there can be states 710 to 730.

State 710 can be an idle state corresponding to the case where the Doppler signal processing device 100 is idle. When the Doppler signal processing device 100 is starting, the startup signal $S_{system\_startup}$ would be transmitted. As the information of the object Obj is received, the initial data $U_{initial}(k)$ of the frequency domain interference estimation signal $U_n(k)$ can be obtained and then enter state 715. The control unit 640 can further obtain initial data $U_{initial}(k)$ according to the difference data $\Delta_n(k)$ and the filtered signal $R_n(k)$ or $E_n(k)$ of a period of time. According to embodiments, the initial data $U_{initial}(k)$ can include an initial value.

For example, if the filtered signal is the signal $E_n(k)$ generated by the envelope detector 6202 in FIG. 6, the abovementioned period of time related to the signal $E_n(k)$ can be the elapsed time of the signals $E_0(k)$, $E_1(k)$, $E_2(k)$ ... $E_{Nacq-1}(k)$, that is, the time for the time domain block index n to change from 0 to Nacq-1. State 715 can be an information acquisition state; where $U_{initial}$ can be an average of a plurality of amplitude values. For example, $U_{initial}(k)$ can be AVG$\{E_0(k), E_1(k), E_2(k) ... E_{Nacq-1}(k)\}$, and AVG{ } can be an averaging function.

After State 715, the FSM can enter State 720. State 720 can be a slow tracking state. The control unit 640 can enter the slow tracking state (State 720) to update the frequency domain interference estimation signal $U_n(k)$ in a first speed. In this case, the update can be slower, and more original portion of the signal is retained.

After State 720, the FSM can enter State 725 according to the signal $S_{to\_fast}$. The State 725 can be a fast tracking state. The control unit 640 can enter the fast tracking state (State 725) to update the frequency domain interference estimation signal $U_n(k)$ in a second speed faster than the first speed. In this case, the update can be faster, and less original portion of the signal is retained.

After State 725, the FSM can enter State 720 according to the signal $S_{\sim to\_fast}$. The FSM can alternatively enter States 720 and 725 according to demand as shown in FIG. 7.

After State 720, the FSM can enter State 730 according to a signal $S_{\sim(to\_slow|to\_fast)}$. The State 730 can be a frozen state to stop updating the frequency domain interference estimation signal $U_n(k)$. The FSM can enter State 720 from State 730 according to a signal $S_{to\_slow}$.

Figure 8:
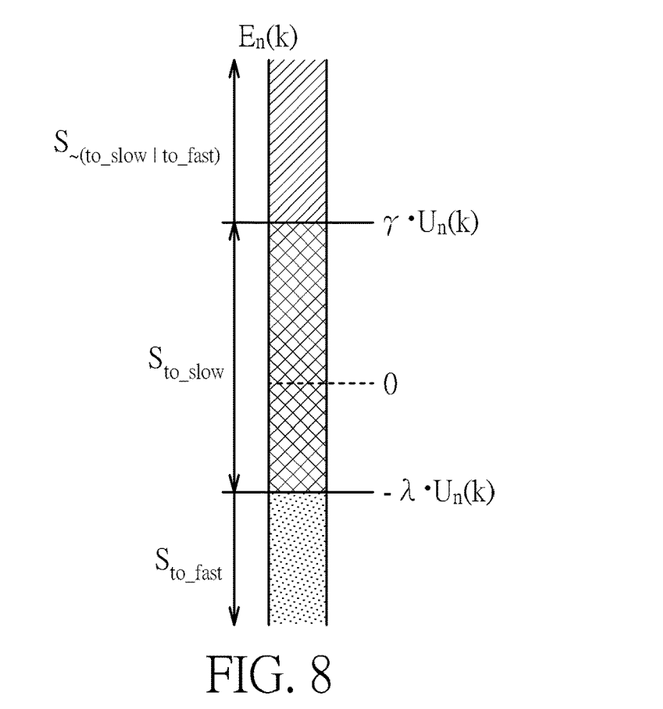
FIG. 8 illustrates the ranges of the filter signal generated by the filter unit of FIG. 6.

FIG. 8 illustrates the ranges of the filter signal generated by the filter unit 620 of FIG. 6, where the ranges are related to the states of FIG. 7. As above, the filter signal can be $R_n(k)$ or $E_n(k)$ shown in FIG. 6, and here the filter signal is $E_n(k)$ as an example. The control unit 640 can enter the slow tracking state (e.g., State 720 of the FSM shown in FIG. 7) when the filtered signal $E_n(k)$ is between a first threshold and a second threshold higher than the first threshold. For example, as shown in FIG. 8, the first threshold can be $-\lambda \cdot U_n(k)$, and the second threshold can be $\gamma \cdot U_n(k)$, where $\lambda$ and $\gamma$ can be given positive numbers. The control unit 640 can enter the fast tracking state (e.g., State 725 of the FSM shown in FIG. 7) when the filtered signal $E_n(k)$ is lower than the first threshold $-\lambda \cdot U_n(k)$. The control unit 640 can enter the frozen state (e.g., State 730 of the FSM shown in FIG. 7) when the filtered signal $E_n(k)$ is higher than the second threshold $\gamma \cdot U_n(k)$. In other words, the foresaid signal $S_{to\_slow}$ can be related to a condition in which $E_n(k) < \gamma \cdot U_n(k)$ and $E_n(k) > -\lambda \cdot U_n(k)$. The foresaid signal $S_{to\_fast}$ can be related to another condition in which $E_n(k) < -\lambda \cdot U_n(k)$. The foresaid signal $S_{\sim(to\_slow|to\_fast)}$ can be related to yet another condition in which $E_n(k) \geq \gamma \cdot U_n(k)$.

Regarding the foresaid adjustment data $Q_n(k)$ shown in FIG. 6, the adjustment data $Q_n(k)$ can be expressed as the following equation eq-5:

$$Q_n(k) = \begin{cases} (1 - \alpha_{fast}) \times (E_n(k) - U_n(k)), & \text{when state is "Fast Tracking"} \\ (1 - \alpha_{slow}) \times (E_n(k) - U_n(k)), & \text{when state is "Slow Tracking"} \\ 0, & \text{when state is "Frozen"} \end{cases} \quad \text{eq-5}$$

where $\alpha_{fast}$ and $\alpha_{slow}$ are positive numbers ranges from 0 to 1 and can be parameters selected and used for adjusting the adjustment data $Q_n(k)$. For example, "Fast Tracking" state, "Slow Tracking" state and "Frozen" state mentioned in the equation eq-5 can be respectively State 725, State 720 and state 730 shown in FIG. 7.

FIG. 1 to FIG. 7 mentioned above can describe the structure and states of the device provided by embodiments, and each of the blocks shown in FIG. 2, FIG. 3, FIG. 5 and FIG. 6 can be implemented by using either appropriate hardware (such as circuits) with suitable control software and/or firmware or software functions implemented in an embedded MCU or DSP (digital signal processor) in Doppler signal processing device 100 of FIG. 1

Figure 9:
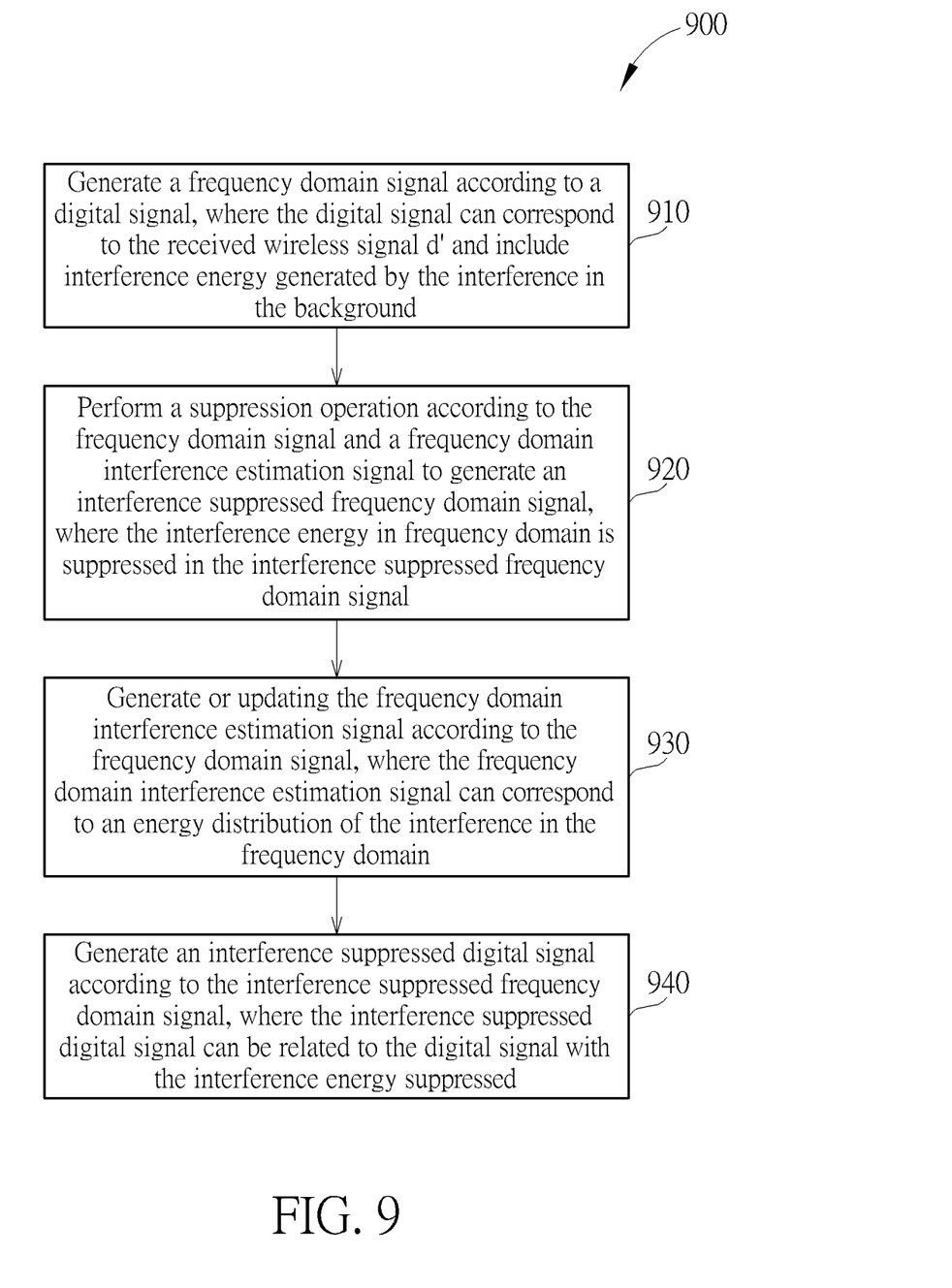
FIG. 9 is a flowchart of a Doppler signal processing method for suppressing interference.

FIG. 9 is a flowchart of a Doppler signal processing method 900 for suppressing interference in a background according to the received wireless signal d' shown in FIG. 1. The Doppler signal processing method 900 can be performed by the signal detection device 10 and the Doppler signal processing device 100 mentioned above, and include following steps.

Step 910: generate a frequency domain signal $X_n(k)$ according to a digital signal x(i), where the digital signal x(i) can correspond to the received wireless signal d' and include interference energy generated by the interference in the background;

Step 920: perform a suppression operation according to the frequency domain signal $X_n(k)$ and a frequency domain interference estimation signal $U_n(k)$ to generate an interference suppressed frequency domain signal $Y_n(k)$, where the interference energy in frequency domain is suppressed in the interference suppressed frequency domain signal $Y_n(k)$;

Step 930: generate or updating the frequency domain interference estimation signal $U_a(k)$ according to the frequency domain signal $X_n(k)$, where the frequency domain interference estimation signal $U_a(k)$ can correspond to an energy distribution of the interference in the frequency domain; and Step 940: generate an interference suppressed digital signal y(i) according to the interference suppressed frequency domain signal $Y_n(k)$, where the interference suppressed digital signal y(i) can be related to the digital signal x(i) with the interference energy suppressed.

Steps 910, 920, 930 and 940 can be respectively related to the frequency analyzer 110, the interference suppressor 120, the interference baseline estimator 130 and the synthesizer 140 mentioned in FIG. 2, FIG. 3 and FIG. 5. The related details can be as above and not repeatedly described.

In summary, the signal detection device 10, the Doppler signal processing device 100 and the Doppler signal processing method 900 provided by embodiments can effectively update the detection result by suppressing interference. Stationary interference, such as Quasi-stationary interference in the background can be greatly reduced. Hence, accurate tracking control can be achieved. In addition, interference suppression calculations can remove interference energy corresponding to a specific frequency band in the background, thereby improving detection accuracy.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A Doppler signal processing device for suppressing interference in a background according to a received wireless signal, the Doppler signal processing device comprising:
    a frequency analyzer configured to generate a frequency domain signal according to a digital signal, wherein the digital signal corresponds to the received wireless signal and comprises interference energy generated by the interference in the background;
    an interference suppressor configured to perform a suppression operation according to the frequency domain signal and a frequency domain interference estimation signal to generate an interference suppressed frequency domain signal, wherein the interference suppressed frequency domain signal is related to the frequency domain signal subtracted by the frequency domain interference estimation signal during an object detection;
    an interference baseline estimator configured to generate or update the frequency domain interference estimation signal according to the frequency domain signal, wherein the frequency domain interference estimation signal corresponds to an energy distribution of the interference in the frequency domain; and
    a synthesizer configured to generate an interference suppressed digital signal according to the interference suppressed frequency domain signal, wherein the interference suppressed digital signal is related to the digital signal with the interference energy suppressed.

2. The Doppler signal processing device of claim 1, wherein the frequency domain signal comprises a frequency domain signal vector, and the frequency domain interference estimation signal comprises a frequency domain interference estimation signal vector.

3. The Doppler signal processing device of claim 1, wherein the frequency analyzer performs a short-time Fourier transform to generate the frequency domain signal by using the digital signal.

4. The Doppler signal processing device of claim 3, wherein the frequency analyzer further performs a buffer operation to collect the digital signal of different time points as an input of the short-time Fourier transform.

5. The Doppler signal processing device of claim 3, wherein the synthesizer is configured to perform an inverse fast Fourier transform by using the interference suppressed frequency domain signal to generate a time-domain signal related to the interference suppressed digital signal.

6. The Doppler signal processing device of claim 5, wherein the synthesizer is configured to further perform an overlap-and-addition operation by using the time-domain signal to generate the interference suppressed digital signal.

7. The Doppler signal processing device of claim 1, wherein the frequency analyzer comprises a first filter bank configured to filter the digital signal to generate the frequency domain signal.

8. The Doppler signal processing device of claim 7, wherein the synthesizer comprises a second filter bank configured to filter the interference suppressed frequency domain signal to generate the interference suppressed digital signal.

9. The Doppler signal processing device of claim 1, wherein an interference baseline estimator comprises:
    an absolute data unit configured to generate absolute data of the frequency domain signal;
    a filter unit configured to generate a filtered signal according to the absolute data;
    a subtracter configured to generate difference data of the filtered signal and the frequency domain interference estimation signal;
    a control unit configured to process the difference data to generate adjustment data;
    an adder configured to add the adjustment data and the frequency domain interference estimation signal to generate an updated frequency domain interference estimation signal; and
    a delay unit configured to use the updated frequency domain interference estimation signal to replace the frequency domain interference estimation signal.

10. The Doppler signal processing device of claim 9, wherein the absolute data comprises an absolute value, the difference data comprises a difference value, the adjustment data comprises an adjustment value, and the filtered signal comprises a filtered signal vector.

11. The Doppler signal processing device of claim 9, wherein the filter unit comprises:
    a third filter configured to filter the absolute data to generate the filtered signal.

12. The Doppler signal processing device of claim 9, wherein the filter unit comprises:
    a third filter configured to filter the absolute data to generate a preliminary filtered signal; and
    an envelope detector configured to obtain envelop information of the preliminary filtered signal to generate the filtered signal.

13. The Doppler signal processing device of claim 12, wherein the preliminary filtered signal comprises a preliminary filtered signal vector.

14. The Doppler signal processing device of claim 9, wherein the control unit is further configured to obtain initial data according to the difference data and the filtered signal of a period of time, enter a slow tracking state to update the frequency domain interference estimation signal in a first speed, enter a fast tracking state to update the frequency domain interference estimation signal in a second speed faster than the first speed, and enter a frozen state to stop updating the frequency domain interference estimation signal.

15. The Doppler signal processing device of claim 14, wherein the initial data comprises an initial value.

16. The Doppler signal processing device of claim 14, wherein the control unit enters the slow tracking state when the filtered signal is between a first threshold and a second threshold higher than the first threshold, enters the fast tracking state when the filtered signal is lower than the first threshold, and enters the frozen state when the filtered signal is higher than the second threshold.

17. A Doppler signal processing method for suppressing interference in a background according to a received wireless signal, the Doppler signal processing method comprising:
- generating a frequency domain signal according to a digital signal, wherein the digital signal corresponds to the received wireless signal and comprises interference energy generated by the interference in the background;
- performing a suppression operation according to the frequency domain signal and a frequency domain interference estimation signal to generate an interference suppressed frequency domain signal, wherein the interference suppressed frequency domain signal is related to the frequency domain signal subtracted by the frequency domain interference estimation signal during an object detection;
- generating or updating the frequency domain interference estimation signal according to the frequency domain signal, wherein the frequency domain interference estimation signal corresponds to an energy distribution of the interference in the frequency domain; and
- generating an interference suppressed digital signal according to the interference suppressed frequency domain signal, wherein the interference suppressed digital signal is related to the digital signal with the interference energy suppressed.

18. The Doppler signal processing method of claim 17, further comprising:
- performing a short-time Fourier transform to generate the frequency domain signal by using the digital signal; and
- performing an inverse fast Fourier transform by using the interference suppressed frequency domain signal to generate a time-domain signal related to the interference suppressed digital signal.

19. The Doppler signal processing method of claim 18, further comprising:
- performing an overlap-and-addition operation by using the time-domain signal to generate the interference suppressed digital signal.

20. The Doppler signal processing method of claim 17, further comprising:
- filtering the digital signal to generate the frequency domain signal; and
- filtering the interference suppressed frequency domain signal to generate the interference suppressed digital signal.

* * * * *